United States Patent
Ma et al.

(10) Patent No.: US 11,245,535 B2
(45) Date of Patent: Feb. 8, 2022

(54) HASH-CHAIN BASED SENDER IDENTIFICATION SCHEME

(71) Applicant: THE REGENTS OF THE UNIVERSITY OF MICHIGAN, Ann Arbor, MI (US)

(72) Inventors: Di Ma, Northville, MI (US); Andre Weimerskirch, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 594 days.

(21) Appl. No.: 16/318,397

(22) PCT Filed: Jul. 18, 2017

(86) PCT No.: PCT/US2017/042583
§ 371 (c)(1),
(2) Date: Jan. 17, 2019

(87) PCT Pub. No.: WO2018/017566
PCT Pub. Date: Jan. 25, 2018

(65) Prior Publication Data
US 2019/0288849 A1 Sep. 19, 2019

Related U.S. Application Data (60) Provisional application No. 62/363,464, filed on Jul. 18, 2016.

(51) Int. Cl.
*H04L 29/06* (2006.01)
*H04L 9/32* (2006.01)
(Continued)

(52) U.S. Cl.
CPC .......... *H04L 9/3242* (2013.01); *H04L 9/0866* (2013.01); *H04L 12/40* (2013.01);
(Continued)

(58) Field of Classification Search
CPC . H04L 12/4625; H04L 2209/60; H04L 67/12; H04L 12/40; H04L 2012/40273;
(Continued)

(56) References Cited

U.S. PATENT DOCUMENTS 7,307,994 B2   12/2007  Kurita
9,288,048 B2 * 3/2016  Han ...................... H04L 9/3242
(Continued)

OTHER PUBLICATIONS

P. Vinoth et al. 'To Prevent Wireless Attack Happens in Automobile is Rectified by a Security Protocol Using CAN.' In: ICMEET 2016, India, Mar. 10-11, 2016. IJIRSET vol. 5, Special Issue 3, Mar. 2016, pp. 99-107, ISSN 2319-8753.
(Continued)

*Primary Examiner* — Tri M Tran
(74) *Attorney, Agent, or Firm* — Harness, Dickey & Pierce, P.L.C.

(57) ABSTRACT

A cryptographic scheme to provide sender identification on an automotive on-board communication bus has been recently introduced. That protocol is vulnerable to a malicious gateway though. This methodology uses hash-chains to provide sender identification in an automotive on-board communication bus that can be applied to protect the entire communication bus and allows the use of network gateways.

15 Claims, 4 Drawing Sheets

(51) Int. Cl.
  *H04L 12/40* (2006.01)
  *H04L 12/66* (2006.01)
  *H04L 29/08* (2006.01)
  *H04L 9/08* (2006.01)
  *H04L 12/46* (2006.01)

(52) U.S. Cl.
  CPC .......... *H04L 12/4625* (2013.01); *H04L 12/66* (2013.01); *H04L 67/12* (2013.01); *H04L 2012/40273* (2013.01); *H04L 2209/38* (2013.01); *H04L 2209/60* (2013.01)

(58) Field of Classification Search
  CPC ... H04L 12/66; H04L 2209/38; H04L 9/0866; H04L 9/3242
  See application file for complete search history.

(56) References Cited

U.S. PATENT DOCUMENTS

| | | |
|---|---|---|
| 2010/0329272 A1 | 12/2010 | Tsuboi et al. |
| 2011/0103390 A1 | 5/2011 | Hall et al. |
| 2013/0104231 A1 | 4/2013 | Niner et al. |
| 2014/0250528 A1 | 9/2014 | Moeller et al. |
| 2015/0089236 A1 | 3/2015 | Han et al. |
| 2015/0135271 A1 | 5/2015 | Forest |
| 2015/0172298 A1 | 6/2015 | Otsuka |
| 2016/0173530 A1 | 6/2016 | Miyake |

OTHER PUBLICATIONS

International Search Report and Written Opinion issued in PCT/US2017/042583, dated Oct. 12, 2017; ISA/KR.

\* cited by examiner

HASH-CHAIN BASED SENDER IDENTIFICATION SCHEME

CROSS-REFERENCE TO RELATED APPLICATIONS

This application is the U.S. National Phase Application under 35 U.S.C. 371 of International Application No. PCT/US2017/042583, filed Jul. 18, 2017, which claims the benefit of U.S. Provisional Application No. 62/363,464, filed on Jul. 18, 2016. The entire disclosures of the above applications are incorporated herein by reference.

FIELD

The present disclosure relates to a hash-chain based sender identification scheme for use in controller area networks (CAN).

BACKGROUND

A main and powerful security objective of networks is a secure communication link. Typically the security objectives of a secure communication link are encryption to provide confidentiality of data and prevent eavesdropping, and authentication to provide integrity of data as well as authentication of the sender. In the automotive environment, especially for the controller area network (CAN) on-board bus, message authentication is particularly useful to avoid injection and forging of CAN messages that can induct unwanted vehicle behavior.

Several recent research works demonstrate an attacker is able to access the CAN network via a variety of attacking interfaces such as TPMS, Bluetooth, telematics, and OBD2 and take the whole control of victim vehicle. Securing CAN, especially authenticated CAN becomes an important security challenge. Several cryptographic protocol proposals have been made. Most of them are based on the use of message authentication code (MAC) for CAN message authentication. However, due to the highly restricting space in CAN message (a CAN packet is at most 8 bytes in length) and the demanding real-time requirement, to have a practical deployable solution for CAN authentication is still a challenging job.

Recently, Han, Weimerskirch and Shin presented the IA-CAN protocol to provide sender identification (rather than message authentication). Instead of using the fixed CAN message ID, a sequence of anonymous IDs is generated from a shared secret. The use of anonymous IDs prevents an attacker from injecting forged messages into the CAN network as the attacker is not able to calculate a valid anonymous ID. Since both the sender and target receiver can generate the anonymous IDs beforehand, this protocol is efficient and only adds negligible delay to the identification process. For further details regarding the IA-CAN protocol, reference may be had to U.S. Pat. No. 9,288,048 which is incorporated by reference in its entirety.

However, this scheme poses a problem to the implementation of a secure gateway which provides access control to prevent illegal CAN packets from entering into safety critical subnets. On one hand, if the gateway is not equipped with electronic control unit (ECU) secrets (which are used for anonymous ID generation), it is unable to filter out invalid and potentially malicious CAN packets since the gateway, without knowing the shared secret key between the sender and receiver, is unable to determine whether a received CAN message is a valid one or not. On the other hand, if the gateway is given all the ECU secrets, it can easily become the target of attacks and pose a single point of failure for the system. This scheme is vulnerable when the gateway is malicious, e.g., a compromised gateway. A malicious gateway could either manipulate messages when forwarding them to a different network segment, or inject any message since it knows the secret keys.

This section provides background information related to the present disclosure which is not necessarily prior art.

SUMMARY

This section provides a general summary of the disclosure, and is not a comprehensive disclosure of its full scope or all of its features.

A method is presented for identifying a sender of a data frame in a vehicle network of a vehicle. An nth element of a hash chain is stored as a sender verification key in a data store associated with the gateway, where the hash chain is derived by successive applications of a given hash function to a cryptographic key. The method includes: receiving a data frame sent by a sending electronic control unit to a receiving electronic control unit, where the data frame includes a frame identifier and the frame identifier is derived in part from the cryptographic key; extracting the frame identifier from the data frame; applying the given hash function to the frame identifier to yield a digest; comparing the digest to the sender verification key stored in the data store; and verifying identity of the sender of the data frame when the digest matches the sender verification key. Verifying the identity of the sender may include replacing the sender verification key in the data store with the frame identifier when the digest matches the sender verification key. When the digest does not match the sender verification key discarding, the date frame may be discarded by the gateway. It is noted that the data frame includes a frame identifier but does not include an identifier for the sending electronic control unit or an identifier for the receiving electronic control unit.

In one embodiment, the sending electronic control unit is not directly coupled to the serial data link such that the gateway passes the data frame onto the serial data link in response to the digest matching the sender verification key.

In some embodiments, the serial data link is further defined as a controller area network and/or the data frame is communicated amongst the sending electronic control unit and the receiving electronic control unit in accordance with Controller Area Network protocol.

In another aspect, the method for identifying a sender of a data frame is implemented by a verifying electronic control unit in the vehicle network of a vehicle. The method includes: receiving data frame sent by a sending electronic control unit via a serial data link to a receiving electronic control unit; extracting, by the verifying electronic control unit gateway, the frame identifier from the data frame; applying a given hash function to the frame identifier to yield a digest; truncating the digest using a truncation function; retrieving a sender verification key stored in a data store on the verifying electronic unit, where the sender verification key is a portion of a hash chain and the hash chain is derived by successive applications of the given hash function to the cryptographic key; truncating the sender verification key using the truncation function; comparing the truncated digest to the truncated sender verification key; replace the sender verification key in the data store with the frame identifier when the truncated digest matches the truncated sender verification key; and discarding the data frame when the truncated digest does not match the truncated sender verification key.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Controller Area Network (CAN) is a wired multi-master broadcast serial bus that interconnects the various CAN nodes (ECUs) inside a vehicle. There are four types of CAN frames: a data frame that is used to transmit data; a remote frame that requests transmission of data from another ECU; an error frame that is used to indicate an error and transmitted by any unit on detecting a bus error; and an overload frame to introduce extra delay between frames. While particular reference is made to CAN throughout this application, it is readily understood that other types of communication protocols fall within the broader aspects of this disclosure.

Figure 1A:
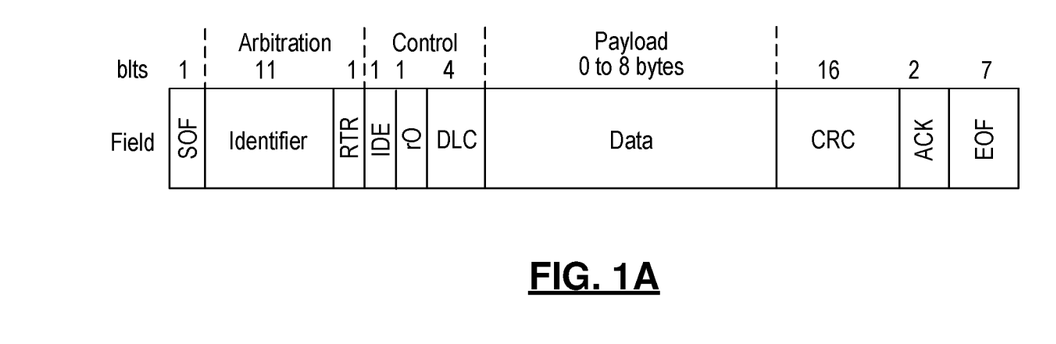
FIGS. 1A and 1B are diagrams depicting a standard and extended data format, respectively, for a CAN data frame.
Figure 1B:
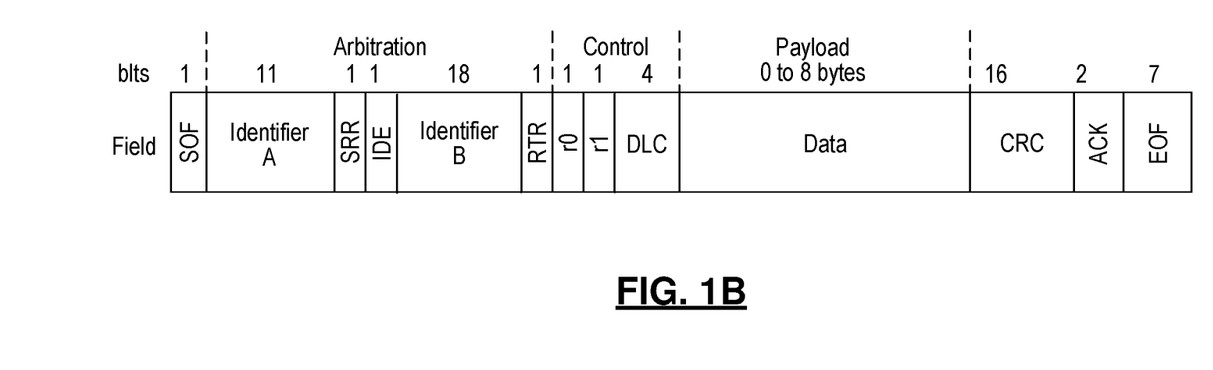

The CAN standard data frame format and the extended data frame format are depicted in FIGS. 1A and 1B, respectively. Both contain 1 bit for start of frame (SOF) and 7 bits for end of frame (EOF). The arbitration field contains identifier (ID) bits and 1 bit for setting the remote-transmission-request (RTR) status. The standard frame format allows an 11-bit ID (Identifier field in FIG. 1A), while the extended frame format allows a 29-bit ID (Identifier A and B fields in FIG. 1B). Setting RTR to 1 means that the frame is a remote frame which does not carry any data.

Control field contains a 4-bit data length code (DLC) indicating the number of bytes of data, and reserved bits (1-bit identifier extension (IDE), and 1-bit r0 for the standard frame format and r1 for the extended frame format). For IDE bit, Dominate (0) indicates an 11-bit message ID while Recessive (1) indicates a 29-bit message ID.

Payload of a CAN data frame can carry up to 8 bytes of data. While the data frame is sent autonomously by sender ECUs/nodes, receiver ECUs/nodes can send remote frames to request data from a source node. A 16-bit cyclic redundancy check (CRC) field (with a 1-bit CRC delimiter) is provided to check the integrity of each received frame. 2-bit acknowledgement (ACK) field is used to check whether the frame is received correctly.

Error frames only contains 6 bits of consecutive 'Dominant' or 'Recessive' field with 8-bit 'Recessive' delimiter field. Overload frames only contains 6 'Dominant' bits for flag with 8 'Recessive' bits for the delimiter. Error and Overload frames are special types for abnormal situations, where an error is detected or the extra delay is required. For more information on the CAN frame formats, see ISO 11898-1:2003 or other related CAN standards. Data frames having other types of formats also fall within the scope of this disclosure.

Since CAN relies on a multi-master broadcast model, each ECU broadcasts frames and the transmission order is decided via a bus contention mechanism called arbitration. Each ECU broadcasts a frame ID, one bit at a time, and determines the transmission priority by comparing each corresponding bit with the bits broadcast by the other ECUs. The frame with the smallest ID wins the arbitration and gets transmitted. After winning the bus arbitration, the ECU writes the data frame serially (i.e., one bit at a time) onto the CAN bus. Other ECUs must wait until the winner's frame transmission is completed.

Figure 2:
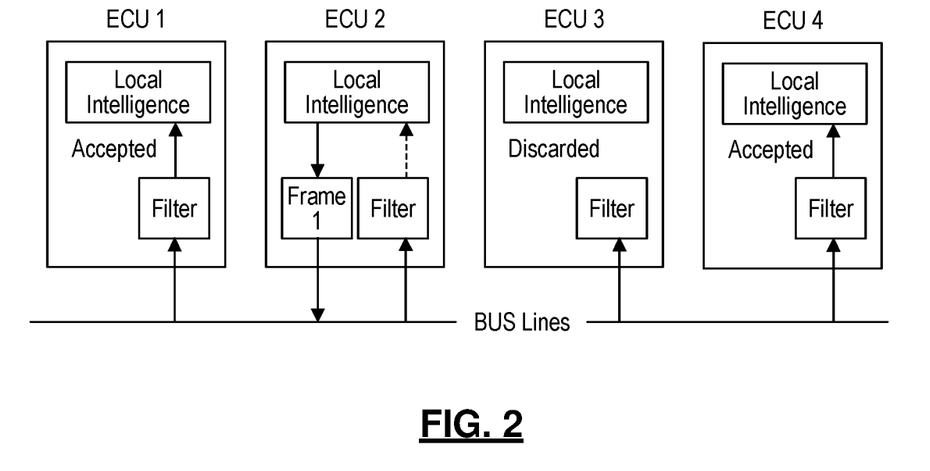
FIG. 2 is a diagram illustrating the CAN communication model.

FIG. 2 illustrates an example CAN communication model. Each data frame includes a frame ID but does not contain an address for either the transmitter nor the receiver ECU. A data frame is broadcast over the serial bus, and each node proceeds with message filtering by checking the frame ID to determine whether to accept or ignore it. In the illustrated example, ECU 2 broadcasts frame 1 which is received by all ECUs on the CAN. ECUs 1 and 4 accept the frame, while ECU 3 discards the frame.

Several researchers have already reported the weakness of CAN's security support. For example, researchers have demonstrated vulnerabilities in current automotive networks by presenting various attack scenarios. There have also been reports revealing CAN's weakness in security when it is open to the external world. Other researchers have argued that CAN is insecure and vulnerable to DoS attacks. All of these issues can be attributed to the following major drawbacks of the CAN architecture. First, there is no provision for authenticating the sender and the receiver of a frame. Second, a CAN frame has no authentication field. Third, the payload field in a CAN frame provides space for only up to 8 bytes of data, making it difficult to implement strong security primitives. Fourth, ECU's have too limited computation capability to support strong cryptographic functions. It is, however, important to note that CAN was designed to be simple and cheap, and to operate in isolation inside a vehicle. Other protocols, such as Flexray, have also been introduced and deployed without addressing these and other security issues. It is difficult to overhaul the entire design of this architecture to support security mechanisms due mainly to automotive manufacturers' reluctance to adopt new standards for cost reasons. Moreover, such cost-consciousness resulted in deploying various types of ECUs, which raises significant performance and DoS risks.

Figure 3:
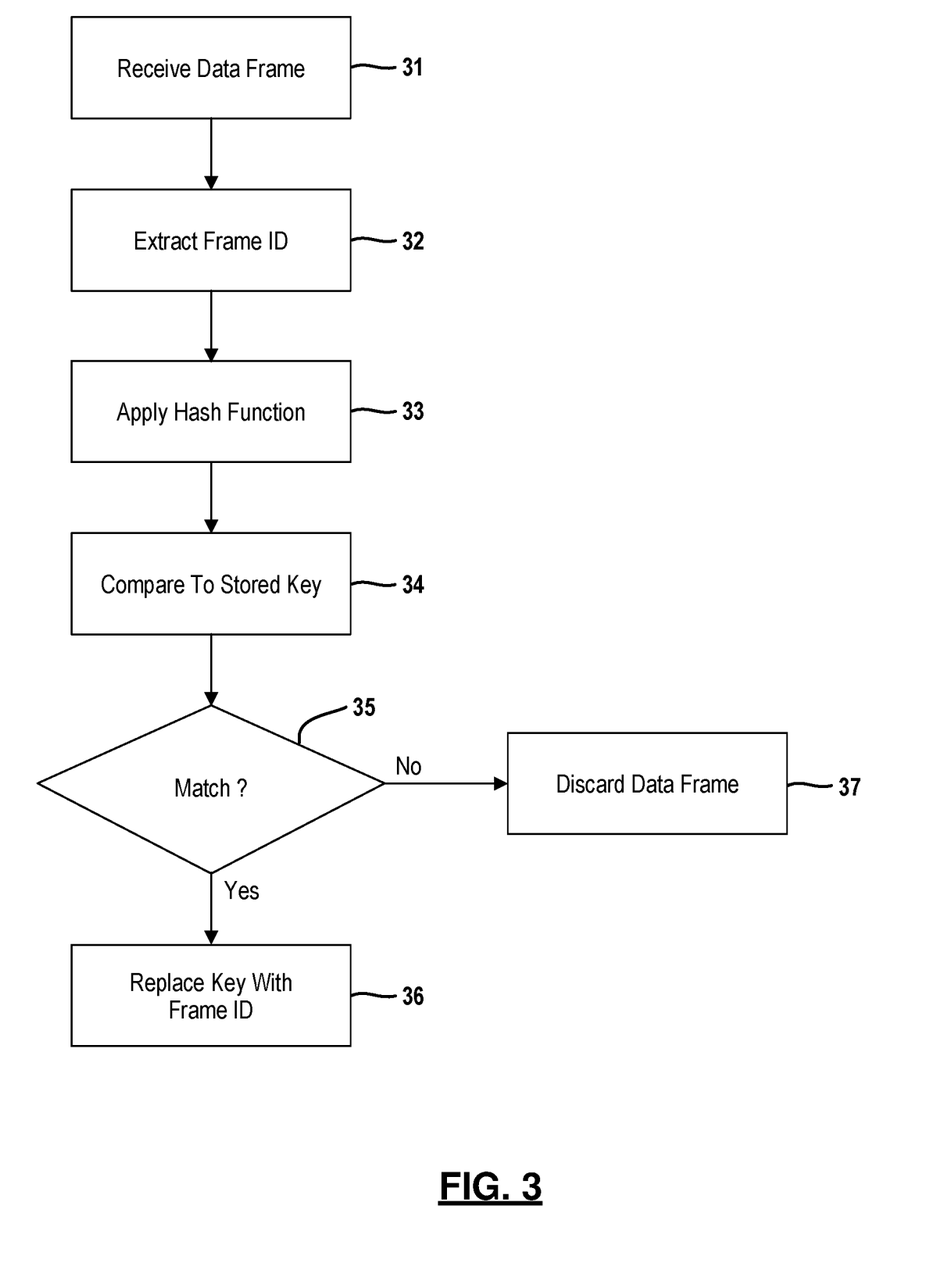
FIG. 3 is a flowchart depicting an example method for identifying a sender of a data frame in a vehicle network.

FIG. 3 depicts an exemplary method for identifying a sender of a data frame in a vehicle network of a vehicle. Similar to the IA-CAN protocol, the proposed method uses anonymous IDs generated from a shared secret to defend against forged message injection attacks. Also the anonymous IDs can be precomputed by both the sender and the target receiver. So it offers the same efficiency in message identification.

Figure 4:
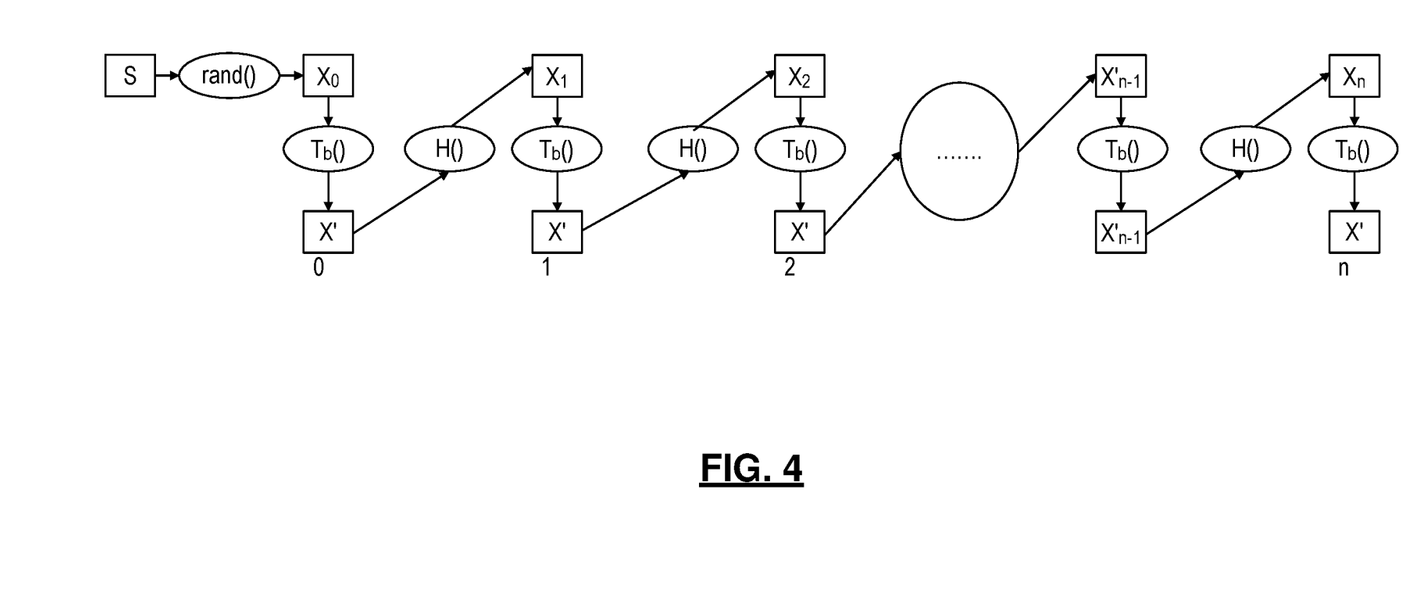
FIG. 4 is a diagram illustrating the generation of a hash-chain.

As a starting point, a hash key is generated by successive applications of a given hash function to a cryptographic (secret) key as seen in FIG. 4. K is a key shared by the sender and receiver ECUs. The shared secret K is used to create a hash-chain with starting element $X_0$, e.g., using a key derivation function (KDF). The hash-chain elements are truncated to form a b-bit HID $X'_i$; using a truncation function $T_b(X_i)$: $X'_i=T_b(X_i)$. It is not restricted whether it is the first, last or any b-bits of $X_i$. The next element is then obtained as $X_i=H(X'_{i-1})$. $X_n$ is the final element of the hash chain and used as the public key. In some embodiments, a one-way random function is applied to the secret key to create the starting element $X_0$. It is readily understood that different types of hash functions and different types of truncation functions are readily known and fall within the scope of this disclosure.

For initialization, the sender and receiver ECU receive the secret key K using some key management scheme. The sender and receiver ECU then generate the hash-chain and store it in a non-transitory memory of the ECU. There are optimization methods available that allow O(n) storage and O(1) computation, O(1) storage and O(n) computation, or O($\log_2 n$) storage and O($\log_2 n/2$) computation. Note that for each CAN-ID, a key K is required.

Figure 5:
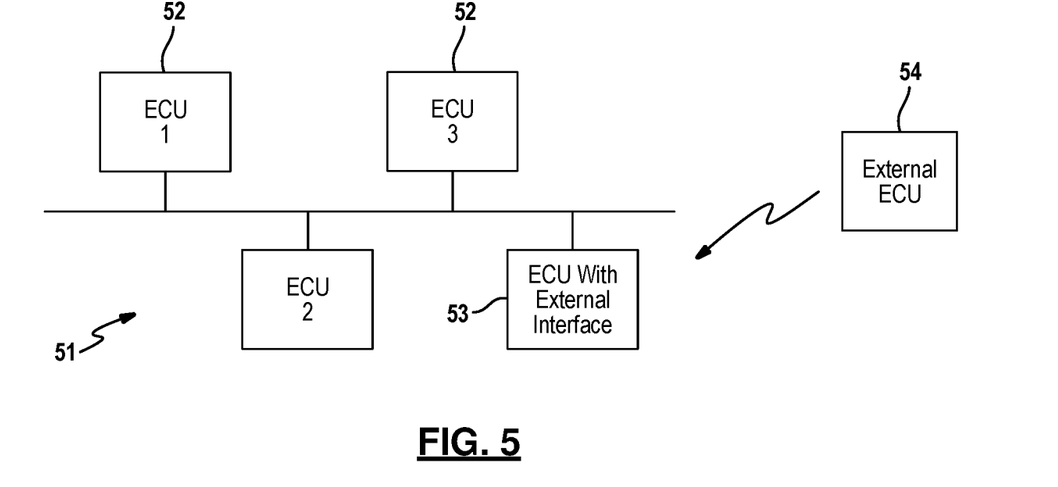
FIG. 5 is a diagram illustrating a vehicle network having at least one electronic control unit with an external interface.

Referring to FIG. 5, a gateway or another verifying ECU 53 receives the nth element of the hash chain key $x_n$ and stores it as a sender verification key in a data store associated with the gateway. In one embodiment, the gateway 53 is an ECU which resides in a vehicle as a node on a vehicle network 51. The vehicle network 51 is comprised of a plurality of ECUs 52 interconnected, for example by a serial data link. In some embodiments, the serial data link is further defined as a controller area network, such that data frames are communicated amongst the ECUs in accordance with Controller Area Network protocol. The gateway 53 may also include an external interface (e.g., Bluetooth or WiFi interface) for communicating with an ECU or another computing device 54 outside of the controller area network. In other embodiments, the gateway is any intermediary ECU on a network that verifies identity of a sender of a data frame transmitted between a sender and a receiver.

Returning to FIG. 3, a data frame sent by a sending electronic control unit to a receiving electronic control unit is received at 31 by the gateway. The data frame includes a frame identifier and the frame identifier is derived in part from the cryptographic key shared by the sending and receiving ECUs. The frame identifier is then extracted from the data frame at 32 by the gateway. It is noted that the data frame does not include an identifier for the sending electronic control unit or an identifier for the receiving electronic control unit.

The same hash function used to generate the hash chain is known to the gateway. The given hash function is applied to the frame identifier at 33 to yield a digest. In the example embodiment, the digest is also truncated using a truncation function. Likewise, the gateway retrieves the sender verification key from its local data store and truncates the sender verification key using the truncation function. As noted above, the sender verification key is a portion of the hash chain used to verify the identity of the sending ECU. In some embodiments, it is understood that method may be performed without truncating the digest and the sender verification key.

Next, the truncated digest is compared to the truncated sender verification key at 35. When the truncated digest matches the truncated sender verification key, the identity of the sender is verified and the received data frame may be processed further. For example, the gateway may permit the data frame to be passed onto the vehicle network and thus received by the intended recipient. Additionally, the sender verification key in the date store is replaced with the frame identifier as indicated at 36. In this way, the hash chain may be used in a similar manner to verify the identity of other data frames sent by the sending ECU. Alternatively, when the truncated digest does not match the truncated sender verification key, the identity of the sender is not verified and the data frame may be discarded at 37 by the gateway. It is to be understood that only the relevant steps of the methodology are discussed in relation to FIG. 3, but that other software-implemented instructions may be needed to control and manage the overall operation of the system.

In the example embodiment, time is divided into periods, starting from 1, say, after the vehicle engine's ignition. In each time period, one message is sent. For time period 1, $HID_1=X'_{n-1}$ is used, and for time period i, $HID_i=X'_{n-i}$ is used. It is assumed here that only periodic messages are sent. Note that event based messages can be modeled with periodic messages by sending a flag as part of a periodic message if an event occurs.

Since the receiver ECU has the shared secret key, it can compute HIDs the same way as the sender and verifying a received HID is straightforward. In the following, focus is on how the gateway is able to verify a received HID without knowing the secret. Suppose at the begin of time period i, the gateway has a verification key $VK_i$. The verification process at the gateway is as follows.

Receives a CAN message with $HID_i=X'_{n-i}$
Calculates $Y=H(HID_i)$ and $Y'=T_b(Y)$
Compares $VK_i==Y'$, verification is successful if $VK_i=Y'$
sets $VK_{i+1}=HID_i$ The gateway is given $X_n$ which serves as the initial verification key. At the begin of time period 1, the gateway derives a verification key from the initial verification key by calculating $VK_1=T_b(X_n)=X'_n$. After receiving $HID_1=X'_{n-1}$, according to the HID generation algorithm, $Y=H(HID_1)=H(X'_{n-1})=X_n$ and $Y'=T_b(Y)=T_b(X_n)=X'_n$. So $VK_1=Y'$. With a successful verification, the gateway is able to set the verification for time period 2 as $VK_2=HID_1=X'_{n-1}$.

In summary, at time period i, $VK_i=X'_{n-i+1}$ while $HID_i=X'_{n-i}$. The construction and evolving of verification keys allow the gateway to verify a message ID without knowing the secret.

When the hash chain is exhausted after n−1 time periods, one can renew the hash chain with a new shared secret. Suppose the sender generates a new shared secret K. It can use the first chain value $X_0$ which has not used yet to securely distribute the new secret to the receiver by the following two steps:

Derives two keys $K_1$ and $K_2$ from $X_0$ through some KDFs
Computes $ENC_{K_1}(K)$ and $MAC_{K_2}(K)$ where ENC( ) is a standard block cipher and MAC is a standard MAC scheme.
Sends both $ENC_{K_1}(K)$ and $MAC_{K_2}(K)$ to the receiver.

Other techniques for renewing the hash chain are also contemplated and fall within the broader aspects of this disclosure.

In this disclosure, a hash-chain based sender authentication scheme is presented for vehicle onboard communication. The protocol offers similar features as the IA-CAN protocol and uses hash IDs (HID) to replace or extend CAN-IDs. It is extremely efficient and only adds negligible computing delays. It provides sender authentication instead of message authentication, however, if needed a MAC can be applied to messages as well. Contrary to IA-CAN, this protocol prevents that a compromised gateway can inject forged messages.

Additional advantages of this protocol are that the anonymous IDs are publicly verifiable. That is, a verifier, given some public information, is able to validate an anonymous ID without knowing the shared secret. In this way it allows a benign gateway to filter out potentially malicious CAN packets which do not have a valid ID. Because no ECU secrets are stored at the gateway, the proposed scheme is less vulnerable to a compromised gateway. Especially, as the gateway does not know private keys, so it cannot inject malicious messages. A compromised gateway can still modify relayed messages, however (as anonymous IDs are for identification instead of authentication). Similar to IA-CAN, this scheme does not affect the ability to integrate a message authentication code (MAC) into the payload filed. Hence, messages that are relayed by the gateway and are potentially critical on the network segment they are relayed to, could use a standard message authentication code (MAC), such as HMAC-SHA-256 on top of the scheme.

Lastly, the hash-chain based scheme consists of the (1) initialization and hash-chain generation at production time, (2) the anonymous ID generation on the sender's side, and (3) the anonymous ID verification on the receivers' side. The scheme generates hash-identifiers (HID) that can either replace or complement the CAN-ID of a CAN message, or that can be used as part of the CAN payload.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, and may include a computer, selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. For example, while reference has been provided to a controller area network, this work can be extended to other networks, such as CAN-FD, Flexray, Ethernet as well as other domains, such as aviation, industrial control systems, etc.

What is claimed is:

1. A method for identifying a sender of a data frame in a vehicle network of a vehicle, comprising:
   storing, by a gateway, nth element of a hash chain as a sender verification key in a data store associated with the gateway, where the hash chain is derived by successive applications of a given hash function to a cryptographic key;
   receiving, by the gateway, a data frame sent by a sending electronic control unit via a serial data link to a receiving electronic control unit, where the data frame includes a frame identifier and the frame identifier is derived in part from the cryptographic key;
   extracting, by the gateway, the frame identifier from the data frame;
   applying, by the gateway, the given hash function to the frame identifier to yield a digest;
   comparing, by the gateway, the digest to the sender verification key stored in the data store; and
   verifying, by the gateway, identity of the sender of the data frame when the digest matches the sender verification key, wherein the gateway is implemented by instructions executed by a computer processor.

2. The method of claim 1 wherein verifying the identity of the sender includes replacing the sender verification key in the data store with the frame identifier when the digest matches the sender verification key.

3. The method of claim 1 wherein the sending electronic control unit is not directly coupled to the serial data link and the gateway passes the data frame onto the serial data link in response to the digest matching the sender verification key.

4. The method of claim 1 further comprises discarding, by the gateway, the data frame when the digest does not match the sender verification key.

5. The method of claim 1 wherein the data frame includes a frame identifier but does not include an identifier for the sending electronic control unit or an identifier for the receiving electronic control unit.

6. The method of claim 1 further comprises sharing the cryptographic key with the sending electronic control unit and the receiving electronic control unit.

7. The method of claim 1 wherein the serial data link is further defined as a controller area network.

8. The method of claim 1 wherein the data frame is communicated amongst the sending electronic control unit and the receiving electronic control unit in accordance with Controller Area Network protocol.

9. The method of claim 1 further comprises generating the hash chain by successive applications of the given hash function to the cryptographic key; and storing the hash chain on the sending electronic control unit and the receiving electronic control unit.

10. A method for identifying a sender of a data frame in a vehicle network of a vehicle, comprising:
receiving, by a verifying electronic control unit, a data frame sent by a sending electronic control unit via a serial data link to a receiving electronic control unit, where the data frame includes a frame identifier and the frame identifier is derived in part from a cryptographic key;
extracting, by the verifying electronic control unit gateway, the frame identifier from the data frame; applying, by the verifying electronic control unit gateway, a given hash function to the frame identifier to yield a digest;
truncating, by the verifying electronic control unit gateway, the digest using a truncation function;
retrieving, by the verifying electronic control unit, a sender verification key stored in a data store on the verifying electronic unit, where the sender verification key is a portion of a hash chain and the hash chain is derived by successive applications of the given hash function to the cryptographic key;
truncating, by the verifying electronic control unit gateway, the sender verification key using the truncation function;
comparing, by the verifying electronic control unit, the truncated digest to the truncated sender verification key;
replace, by the verifying electronic control unit, the sender verification key in the data store with the frame identifier when the truncated digest matches the truncated sender verification key; and
discarding, by the verifying electronic control unit, the data frame when the truncated digest does not match the truncated sender verification key.

11. The method of claim 10 wherein the data frame includes a frame identifier but does not include an identifier for the sending electronic control unit or an identifier for the receiving electronic control unit.

12. The method of claim 10 wherein the serial data link is further defined as a controller area network.

13. The method of claim 10 wherein the data frame is communicated amongst the sending electronic control unit and the receiving electronic control unit in accordance with Controller Area Network protocol.

14. The method of claim 10 further comprises generating the hash chain by successive applications of the given hash function to the cryptographic key and storing at least a portion of the hash chain on the sending electronic control unit and on the receiving electronic control unit.

15. The method of claim 10 further comprises verifying, by the receiving electronic control unit, sender of the data frame using the frame identifier extracted from the data frame and the cryptographic key.

* * * * *